(12) United States Patent
Dlugoss

(10) Patent No.: US 9,969,395 B1
(45) Date of Patent: May 15, 2018

(54) LASH MITIGATION

(71) Applicant: GM GLOBAL TECHNOLOGY OPERATIONS LLC, Detroit, MI (US)

(72) Inventor: Randall B Dlugoss, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/427,296

(22) Filed: Feb. 8, 2017

(51) Int. Cl.
*B60W 30/18* (2012.01)
*B60W 10/02* (2006.01)
*B60W 10/06* (2006.01)
*F02N 11/08* (2006.01)

(52) U.S. Cl.
CPC ............ *B60W 30/18* (2013.01); *B60W 10/02* (2013.01); *B60W 10/023* (2013.01); *B60W 10/026* (2013.01); *B60W 10/06* (2013.01); *F02N 11/0814* (2013.01); *B60W 2510/0685* (2013.01); *B60W 2710/021* (2013.01); *B60W 2710/024* (2013.01)

(58) Field of Classification Search
None
See application file for complete search history.

(56) References Cited

U.S. PATENT DOCUMENTS

| 7,917,275 | B2 * | 3/2011 | Doering | .............. F02D 41/0002 |
| | | | | 701/51 |
| 9,005,077 | B2 | 4/2015 | Kim et al. | |
| 9,694,804 | B2 * | 7/2017 | Nefcy | .................... B60W 10/30 |
| 2015/0329105 | A1 * | 11/2015 | Matsui | ..................... B60K 6/48 |
| | | | | 701/22 |

* cited by examiner

*Primary Examiner* — Dirk Wright

(57) ABSTRACT

A motor vehicle propulsion system, an engine control system, and a method for starting an engine of a motor vehicle system are provided, which are configured to request an engine restart after stopping the engine, decrease a K-factor in a torque converter coupling within 1.5 seconds of requesting the engine restart, and to increase the K-factor in the torque converter coupling to minimize the lash and disturbance between interconnecting components in a vehicle system during negative torque vehicle driving to positive torque propulsion system driving transitions where a torque converter exists.

20 Claims, 3 Drawing Sheets

LASH MITIGATION

FIELD

This disclosure is related to motor vehicle propulsion systems having an engine start-stop system for stopping and restarting the engine during use.

INTRODUCTION

Modern vehicle propulsion systems may include engine start-stop technology configured to stop the engine of the motor vehicle while the motor vehicle is stopped momentarily (e.g., at a traffic light) or while the motor vehicle is coasting to a stop, in order to improve fuel economy and reduce emissions.

Meshed driveline components, such as clutches, gears, and splines, throughout the entire propulsion system driveline, have clearances due to manufacturing tolerances and component design specifications. Gear lash, i.e., play or slack in relative rotational positions of the meshed driveline components, results from the clearances between the meshed driveline components. When an engine is started and a desired gear ratio of the transmission is selected, gear lash contact changes onto a "driving" side of the meshed driveline components resulting in undesirable driveline lash, clunk, or bump.

Lash may occur, for example, when a vehicle is stopped in a start-stop system because hydraulic pressure is no longer present in the propulsion system. Lash is particularly common when an engine is shut off while coasting, because the driveline components may shift in a rearward direction such that when the engine is restarted, lash bump occurs when the components move back in the forward direction. This is a negative torque or motion followed by a positive torque or motion with respect to a point on the driveline.

It is desirable to eliminate or minimize undesirable driveline lash bump or clunk, so that a driver is relatively unaware of such lash when the vehicle is restarted. In order to minimize lash, the propulsion system may be spun to tighten up the components. In some systems, not to be interpreted as a limiting example, an electric machine coupled to a crankshaft of the engine functions as a starter for spinning and cranking the engine during execution of the engine start event. In other systems, a starter motor is utilized for spinning and cranking the engine.

SUMMARY

The present disclosure provides a method and system for minimizing lash during an engine restart (after an autostop) by controlling the K-factor within a torque converter coupling during the engine restart. The K-factor in the torque converter coupling is decreased to increase the coupling force between the torque converter components within a half second of the initial turn of the engine crankshaft upon a restart of the engine following the autostop, or within 1.5 seconds of the engine restart command. Accordingly, the driveline components are pre-tightened before the engine produces significant torque and during the moments at the beginning of positive torque production when the disturbance causing torque is small, mitigating at least a portion of the lash.

In one form, which may be combined or separate from the other forms disclosed herein, a method for starting an engine of a motor vehicle system while minimizing lash is provided, where the motor vehicle system includes an engine crankshaft connected to a torque converter coupling having a torque converter and a torque converter lockup clutch, the torque converter coupling being further connected to a forward drive clutch. The method includes requesting an engine restart after stopping the engine, decreasing a K-factor in the torque converter coupling within 1.5 seconds of requesting the engine restart, and increasing the K-factor in the torque converter coupling.

In another form as is exemplified herein, which may be combined with or separate from the other forms disclosed herein, a control system for an engine of a motor vehicle system is provided. The control system includes an engine stop module configured to stop the engine of the motor vehicle while the motor vehicle is coasting or stopped and an engine start module configured to restart the engine. The control system is configured to request an engine restart after stopping the engine, decrease a K-factor in a torque converter within 1.5 seconds of requesting the engine restart, and increase the K-factor in the torque converter. All of this may occur within a time period for taking up the lash which may not be in a particular order. For example, in some cases, the K-factor may be decreased, a forward drive coupling device may be applied, and the K-factor may then be increased. In another example, the torque converter coupling K-factor may be decreased and increased, and then the forward drive coupling device may be applied.

In yet another form, which may be combined with or separate from the other forms disclosed herein, a propulsion system of a motor vehicle is provided. The propulsion system includes an engine operable to power the motor vehicle. The engine has a crankshaft configured to rotate to move a plurality of pistons within a plurality of piston cylinders. The engine also has an engine output shaft that is configured to transfer torque. A torque converter coupling is connected to the engine output shaft. The torque converter coupling has a torque converter and a torque converter lockup clutch. The torque converter has an impeller and a turbine. The impeller is connected to the engine output shaft. The impeller is configured to form a fluid coupling with the turbine. The torque converter lockup clutch is configured to selectively lock together the impeller and the turbine. A forward drive clutch is connected to the turbine. A transmission is configured to selectively change a gear ratio between the engine output shaft and a transmission output shaft. The forward drive clutch is configured to selectively connect the turbine to the transmission. A control system includes an engine stop module configured to stop the engine while the motor vehicle is coasting or stopped and an engine start module configured to restart the engine. The engine start module is configured to decrease a K-factor in the torque converter coupling within a half second of an initial rotation of the crankshaft upon restart of the engine (before, during, or after), engage the forward drive clutch, and increase the K-factor in the torque converter coupling.

Additional features may also be incorporated, including but not limited to the following: wherein the step of decreasing the K-factor in the torque converter coupling may be achieved by at least partially engaging the torque converter lockup clutch; wherein the step of increasing the K-factor in the torque converter coupling may include disengaging the torque converter lockup clutch; wherein the K-factor is decreased in the torque converter coupling before or during an initial rotation of the engine crankshaft upon restart of the engine; the method further comprising beginning to move the motor vehicle after performing both the steps of decreasing the K-factor and increasing the K-factor. The method may further comprise engaging a starter motor at any moment including subsequent or prior to the step of decreasing the K-factor and subsequent or prior to the step of increasing the K-factor; the method may further comprise enabling a hydraulic pressure system, checking torque converter fluid levels, and determining whether solenoid(s) are engaged; and the method may further comprise increasing the fluid coupling between an impeller and turbine subsequent to the steps of decreasing and increasing the K-factor.

Further additional features may include: the engine start module being configured to decrease the K-factor in the torque converter coupling by at least partially engaging a torque converter lockup clutch; the engine start module being configured to increase the K-factor in the torque converter coupling by disengaging the torque converter lockup clutch; the engine start module being configured to cause the motor vehicle to begin to move after decreasing the K-factor in the torque converter coupling and increasing the K-factor in the torque converter coupling; the engine start module being further configured to engage a starter motor subsequent to decreasing the K-factor of the torque converter coupling and prior to increasing the K-factor of the torque converter coupling; the engine start module being further configured to enable a hydraulic pressure system; and the engine start module being further configured to engage the torque converter to create a fluid coupling between an impeller and a turbine subsequent to decreasing the K-factor of the torque converter coupling and increasing the K-factor of the torque converter coupling.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are included for illustration only and are not intended to limit the scope of this disclosure or the appended claims.

DETAILED DESCRIPTION

Figure 1:
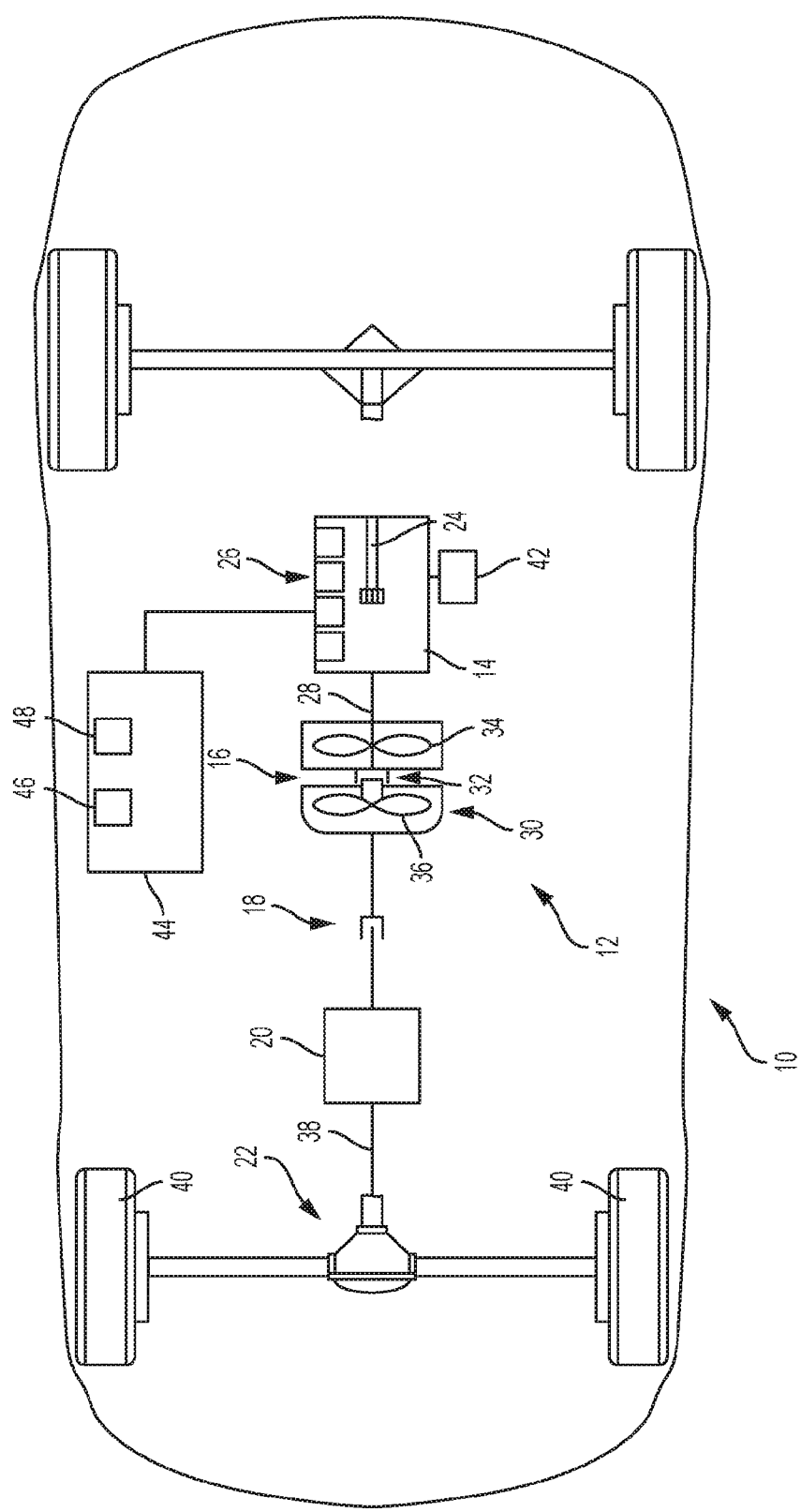
FIG. 1 is a schematic plan view of a motor vehicle including a propulsion system, in accordance with the principles of the present disclosure.

Referring now to the drawings, which are shown for the purpose of illustrating certain examples only and not for the purpose of limiting the same, FIG. 1 illustrates a motor vehicle generally designated at 10. The motor vehicle 10 may be any type of vehicle, such as a car, truck, van, sport-utility vehicle, etc.

The motor vehicle 10 includes a propulsion system 12 configured to power the motor vehicle 10. The propulsion system 12 may include an engine 14, a torque converter coupling 16, a forward drive clutch 18, a transmission 20, and a final drive assembly 22. The engine 14 could be an internal combustion engine, an electric engine, or a hybrid, by way of example. The engine 14 is operable to power the motor vehicle 10 and includes a crankshaft 24 configured to rotate to move a plurality of pistons (not shown) within a plurality of piston cylinders 26. The crankshaft 24 is configured to move each of the pistons within its own respective cylinder 26.

Although the engine 14 is depicted as including four cylinders 26, the engine 14 may include any desired number of cylinders 26, such as two, three, four, six, or eight, by way of example. Each cylinder 26 is configured to undergo a combustion event to power the motor vehicle 10. The engine 14 has an engine output shaft 28 configured to transfer torque to the torque converter coupling 16.

The torque converter coupling 16 is connected to the engine output shaft 28 and includes a torque converter 30 and a torque converter lockup clutch 32. The torque converter 30 has an impeller (or pump) 34 and a turbine 36, which are typically separated by a stator (not shown). The impeller 34 is connected to the engine output shaft 28. The impeller 34 is configured to form a fluid coupling with the turbine 36 under certain conditions, as is known in the art. The torque converter lockup clutch 32 is configured to selectively increase the torque-transmitting capacity between the impeller 34 and the turbine 36 to transmit torque and rotation between the impeller 34 and the turbine 36.

The turbine 36 is connected to the forward drive coupling device 18, which may include a friction clutch, a binary clutch, or a Sprague type device, by way of example. The forward drive coupling device 18 couples the engine 14 and transmission 20 in a forward direction. The transmission 20 is configured to selectively change a gear ratio between the engine output shaft 28 and a transmission output shaft 38. The forward drive coupling device 18 is configured to selectively connect the turbine 36 to the transmission 20. The transmission 20 is interconnected with the final drive unit 22 to propel a set of wheels 40 of the motor vehicle 10. The transmission 20 may be a stepped transmission having planetary gears, a countershaft transmission, a continuously variable transmission, or an infinitely variable transmission, by way of example.

An engine control module 44, or control system, may be used to control the engine 14, including automatic engine start-stop events. For example, the engine control module 44 may include an engine stop module 46 configured to stop the engine 14, for an autostop, while the motor vehicle 10 is coasting toward a stop or stopped (for example, at a traffic light). The engine control module 44 may also include an engine start module 48 configured to restart the engine 14 following the autostop event. Thus, the engine control module 44 includes engine start-stop technology configured to stop the engine 14 of the motor vehicle 10 while the motor vehicle 10 is stopped momentarily (e.g., at a traffic light) or while the motor vehicle 10 is coasting to a stop, in order to improve fuel economy and reduce emissions.

The engine 14 is equipped with a plurality of actuators and sensing devices for monitoring operation and delivering fuel to form a combustion charge to produce torque that is responsive to an operator torque request. The engine 14 is configured to execute autostart and autostop control schemes during ongoing operation of the vehicle 10. In some examples, the engine 14 is preferably started by a secondary starter, such as a low-voltage solenoid-actuated electrical starter motor 42, which is employed for starting the engine 14 in response to the engine start event. The autostart event may be executed subsequent to executing an autostop event to start or restart engine operation during ongoing propulsion.

As aforementioned, gear lash is a play or slack in relative rotational positions of meshed driveline components such as transmission splines, chain, final drive, differential, and interleafed gear teeth on planetary gear sets. Lash may occur, for example, when a vehicle is stopped in a start-stop system because hydraulic pressure and/or positive torque, with respect to a point on the drivetrain, is no longer present in the propulsion system. Lash is particularly common when an engine is shut off while coasting, because the driveline components may shift in a rearward direction (a negative torque direction with respect to a point on the drivetrain) such that when the engine is restarted, lash bump occurs when the components move back in the forward (positive torque) direction.

In order to mitigate lash, the engine start module 48 of the control system 44 is configured to increase coupling between the impeller 34 and turbine 36 momentarily as the propulsion system or engine begins to rotate. Thus, components of the engine 14 and torque converter coupling 16 are tightened in the forward direction prior to moving the vehicle 10 at a predetermined rate of speed, and as such, lash or clunk of the components is minimized. The engine start module 48 is configured to increase coupling in the torque converter 30 to decrease the K-factor in the torque converter coupling 16, which may occur preferably before or during an initial rotation of the crankshaft 24.

The engine restart module 48 is configured to request restart of the engine 14, and then within 1.5 seconds of requesting restart of the engine 14, decrease the K-factor in the torque converter coupling 16.

In this example, after decreasing the K-factor in the torque converter coupling 16 (for example, before or during the initial rotation of the crankshaft 24, or within a half second before or after the initial rotation of the crankshaft 24), the engine start module 48 is configured to engage the forward drive coupling device 18. After the forward drive coupling device 18 is engaged, the engine start module 48 may increase the K-factor in the torque converter coupling 16 to allow the torque converter 30 to couple as dictated by normal engine programming. In some variations, the K-factor in the torque converter coupling 16 may be increased and decreased prior to engaging the forward drive coupling device 18, or the forward drive coupling device 18 may be engaged prior to increasing and decreasing the K-factor in the torque converter coupling 18.

In some variations, the K-factor is increased by momentarily engaging (at least partially) the torque converter clutch 32, which may be performed within a half second before or after the initial rotation of the engine crankshaft 24 upon engine restart. Subsequently, the engine start module 48 may be configured to increase the K-factor in the torque converter coupling 16 by disengaging the torque converter lockup clutch 32.

In other examples, the K-factor in the torque converter coupling 16 could be decreased by changing the position of fins in the torque converter 30, pumping a stiffer fluid through the torque converter 30, modifying the stiffness of the fluid within the torque converter by way an electrical signal that would stiffen the material, for example, through the use of nanotechnology particles and/or electrochemical fluid, or bringing fins of the torque converter 30 closer together, by way of example. Correspondingly, the K-factor in the torque converter coupling 16 could be increased by changing the position of fins, pumping a less stiff fluid through the torque converter 30, modifying the stiffness of the fluid within the torque converter by way of nanotechnology and electrochemical means, or moving fins 30 of the torque converter 30 farther apart.

In some examples, the engine start module 48 is configured to cause the motor vehicle 10 to begin to move after the step of decreasing the K-factor in the torque converter coupling 16. Further, the vehicle 10 may not be moved until after the engine start module 48 subsequently increases the K-factor in the torque converter coupling 16. In other examples, the vehicle 10 may already be moving as the K-factor is decreased then increased, but at low speeds, such as speeds not exceeding 10 or 20 miles per hour.

In some examples, the engine start module 48 may be configured to engage the starter motor 42 subsequent to decreasing the K-factor of the torque converter coupling 16, but the starter motor 42 may be engaged prior to increasing the K-factor of the torque converter coupling 16.

The engine start module 48 may also be configured to enable other parts of the autostart system, such as by engaging a hydraulic pressure system, such as an accumulator discharge to pressurize the fluid lines within the engine 14 and/or transmission 20. Similarly, the engine start module 48 could be configured to engage in other engine preparation for restart, such as by checking the battery life, the fluid level (such as the torque converter fluid level), and the solenoid engagement status. The engine stop module 46 may also be configured to engage in such checking steps, to make sure the propulsion system 12 is in suitable condition for undergoing an autostop event.

The engine start module 48 may also be configured to engage the torque converter 30 to create a fluid coupling between the impeller 34 and the turbine 36 subsequent to decreasing the K-factor of the torque converter coupling 16, and also subsequent to increasing the K-factor of the torque converter coupling 16.

Figure 2:
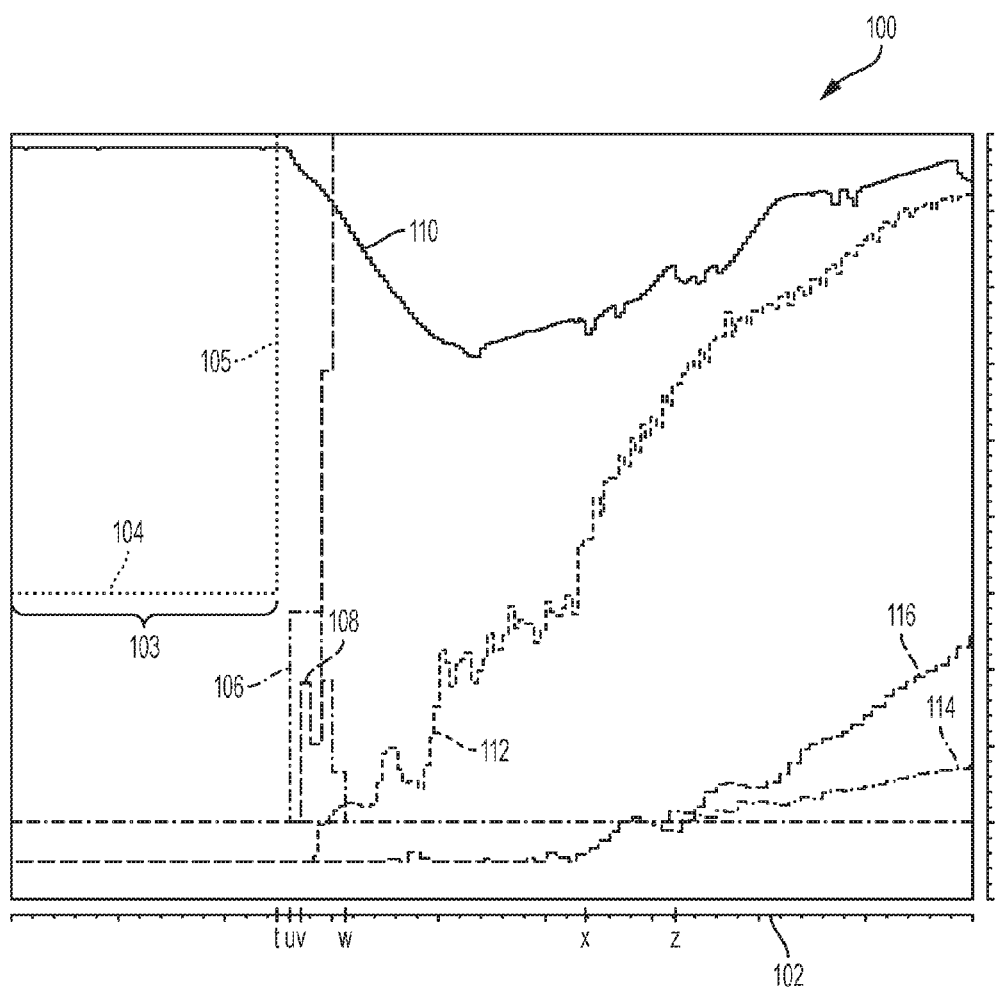
FIG. 2 is a graph illustrating a motor vehicle accumulator pressure, engine speed, turbine speed, an engine start command, vehicle speed, forward drive clutch engagement, and torque converter lockup clutch engagement with respect to time, according to the principles of the present disclosure.

Referring to FIG. 2, a graph 100 illustrates the order through which the above-described steps of the engine start module 48 take place. For example, time is illustrated as number 102 on an x-axis of the graph 100, and the y-axis represents various different values for each of the parameters 104, 106, 108, 110, 112, 114, 116 illustrated as lines on the graph 100. The exact value for each of the graphed parameters 104, 106, 108, 110, 112, 114, 116 varies depending on which parameter is being addressed.

More particularly, an engine start stop mode command is illustrated at parameter 104, with the engine 14 being in the stop mode in section 103 and in the start mode in section 105 (and beyond along the y-axis 102). Thus, the engine start command 105 occurs at time=t on the y-axis 102.

Next, at time=u on the y-axis 102, the torque converter clutch 32 is engaged, or at least partially engaged, and illustrated at parameter graph line 106. In some examples, time u occurs within 1 second or within 1.5 seconds of time t. Subsequent to engaging the torque converter clutch 32 at time=u, the forward drive clutch 18 is engaged as shown at parameter graph line 108 at time=v along the y-axis 102. The torque converter clutch 32 may then be gradually disengaged in a stepped fashion as illustrated until fully disengaged at time=w.

Other parameters illustrated on the graph 100 include pressure in the accumulator, shown at graph line 110. Thus, at approximately time=u, the accumulator begins to discharge to pressurize the system 12. Engine speed (crankshaft speed) is illustrated at graph line 112. Accordingly, the graph line 112 illustrates that engine speed is at zero at time=v, but the crankshaft 24 begins to move before time=w when the torque converter clutch 32 is disengaged. However, vehicle speed remains at zero until time=z, as vehicle speed is shown at graph line 114. Finally, turbine speed is shown at graph line 116, which indicates that the fluid coupling between the impeller 34 and the turbine 36 begins to occur at about time=x.

Figure 3:
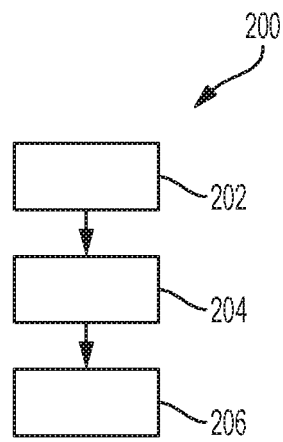
FIG. 3 is a block diagram illustrating a method for starting an engine of a motor vehicle system while minimizing lash, in accordance with the principles of the present disclosure.

Referring now to FIG. 3, a method for starting an engine of a motor vehicle system while minimizing lash is illustrated and generally designated at 200. The method 200 includes a step 202 of requesting an engine restart after stopping the engine. The method 200 further includes a step 204 of decreasing a K-factor in the torque converter coupling, which may be performed within a half second of an initial rotation of the engine crankshaft (before, after, or during the initial rotation of the crankshaft). The step 204 of decreasing a K-factor in the torque converter coupling is performed within 1.5 seconds of the step 202 of requesting the engine restart. The method 200 then includes a step 206 of increasing the K-factor in the torque converter coupling.

As described above, the step 204 of decreasing the K-factor in the torque converter coupling may include engaging (at least partially) the torque converter lockup clutch, and the step 206 of increasing the K-factor in the torque converter coupling may include disengaging the torque converter lockup clutch. Further, the method 200 may include beginning to move the motor vehicle after performing both the steps of decreasing the K-factor and increasing the K-factor, as shown in FIG. 2, where the vehicle speed 114 does not increase until time=z, after the K-factor has been decreased and increased through the engagement and disengagement of the torque converter lockup clutch at time=u and w, respectively.

In some cases, the method 200 may include engaging the forward drive coupling device before or after increasing the K-factor of the torque converter coupling. In some examples, the steps 204, 206 of increasing and decreasing the K-factor in the torque converter coupling, as well as engaging the forward drive coupling device, are all performed within 1.5 seconds of the step 202 of requesting the engine restart.

In addition, the method 200 may include engaging the torque converter to create a fluid coupling between the impeller and the turbine subsequent to the steps 204, 206 of decreasing and increasing the K-factor, as shown in FIG. 2, where the turbine speed increases at time=x, only after the torque converter lockup clutch has been engaged and disengaged at time=u and w, respectively.

Figure 4:
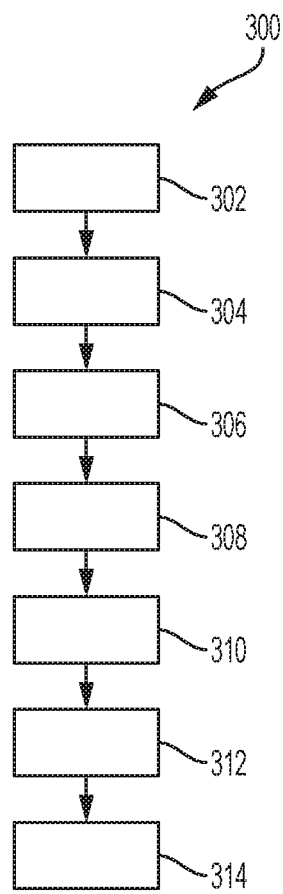
FIG. 4 is a block diagram illustrating another variation of a method for starting an engine of a motor vehicle system while minimizing lash, according to the principles of the present disclosure.

Referring now to FIG. 4, another example of a method for starting an engine of a motor vehicle system while minimizing lash is illustrated and generally designated at 300. The method 300 begins at step 302, which includes preparing the engine 14 for an autostart. This may include checking the fluid level of the torque converter coupling 16 and checking to ensure that a solenoid is engaged for starting the engine 14, among any other desired preparation measures. The step 302 may also include commanding the engine to restart, such as at time=t, as shown in FIG. 2.

The method 300 then proceeds to step 304, which includes enabling a hydraulic pressure system (such as an accumulator). As shown in FIG. 2, the accumulator may begin to discharge at time=u after it is enabled, which could occur at time=t or between times t and u, by way of example.

Next, the method 300 proceeds to step 306, which includes decreasing the K-factor in the torque converter coupling, which occurs within 1.5 seconds of the engine restart command 104. The step 306 of decreasing the K-factor in the torque converter coupling may also occur during or before an initial rotation of the engine crankshaft upon restart of the engine, as commanded by command 104 shown in FIG. 2 at section 105 at time=t, by way of example; or within a half second of the initial rotation of the crankshaft. As shown in FIG. 2, the K-factor may be decreased by applying the torque converter lockup clutch at time=u. The method 300 may then include a step 308 of engaging the starter motor 42.

Next, the method 300 may include a step 310 of engaging the forward drive clutch 18. The method 300 then includes a step 312 of increasing the K-factor in the torque converter coupling 16. The method 300 may then include a step 314 of starting the engine 14 as normal.

As described above, the step 306 of decreasing the K-factor in the torque converter coupling may include engaging (at least partially) the torque converter lockup clutch 32, for example, at time=u. The step 312 of increasing the K-factor in the torque converter coupling may include disengaging the torque converter lockup clutch 32, for example, at time=w.

Further, the method 300 may include beginning to move the motor vehicle after performing both the steps of decreasing the K-factor and increasing the K-factor, as shown in FIG. 2, where the vehicle speed 114 does not increase from zero until time=z, after the K-factor has been decreased and increased through the engagement and disengagement of the torque converter lockup clutch 32 at time=u and w, respectively.

In addition, the method 300 may include engaging the torque converter 30 to create a fluid coupling between the impeller 34 and the turbine 36 subsequent to the steps 306, 312 of decreasing and increasing the K-factor, as shown in FIG. 2, where the turbine speed increases at time=x, only after the torque converter lockup clutch 32 has been engaged and disengaged at time=u and w, respectively.

In order to determine when to stop and/or restart the engine, the method 300 may further include monitoring driver output torque request(s) and vehicle speed. The monitored output torque request(s) can be determined by monitoring operator inputs to an accelerator pedal and a brake pedal. The vehicle speed can be determined by monitoring one or more of the sensing devices and the operator torque request(s). For instance, the vehicle speed can be determined by measuring the rotational velocity of the output shaft 38 of the transmission 20.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The engine control system 44 may be configured to execute each of the steps of the methods 200, 300. Thus, the entire description with respect to FIGS. 1-4 may be applied by the engine control system 44 to effectuate the methods 200, 300 shown in FIGS. 3 and 4. Furthermore, the engine control system 44 may be or include a controller that includes a number of control logics that are configured to execute the steps of the methods 200, 300.

The controller(s) of the engine control system 44 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the invention as defined in the appended claims.

What is claimed is:

1. A method for restarting an engine of a motor vehicle system while minimizing lash, the motor vehicle system including an engine crankshaft connected to a torque converter coupling having a torque converter and a torque converter lockup clutch, the torque converter coupling being further connected to a forward drive clutch, the method comprising:
   requesting an engine restart after stopping the engine;
   decreasing a K-factor in the torque converter coupling within 1.5 seconds of requesting the engine restart; and
   increasing the K-factor in the torque converter coupling.

2. The method of claim 1, wherein the step of increasing the K-factor in the torque converter coupling is performed within 1.5 seconds of requesting the engine restart, the method further comprising engaging the forward drive clutch within 1.5 seconds of requesting the engine restart.

3. The method of claim 1, wherein the step of decreasing the K-factor in the torque converter coupling includes at least partially engaging the torque converter lockup clutch, and the step of increasing the K-factor in the torque converter coupling includes disengaging the torque converter lockup clutch.

4. The method of claim 3, wherein the step of decreasing the K-factor coupling is performed within a half second of before or after an initial rotation of the engine crankshaft upon engine restart to minimize lash.

5. The method of claim 4, further comprising beginning to move the motor vehicle after performing both the steps of decreasing the K-factor and increasing the K-factor.

6. The method of claim 4, further comprising engaging a starter motor subsequent to the step of decreasing the K-factor and prior to the step of increasing the K-factor.

7. The method of claim 6, further comprising:
   enabling a hydraulic pressure system;
   checking a fluid level; and
   determining whether a solenoid is engaged.

8. The method of claim 7, further comprising engaging the torque converter to create a fluid coupling between an impeller and turbine subsequent to the steps of decreasing and increasing the K-factor.

9. A control system for a propulsion system of a motor vehicle, the control system comprising:
   an engine stop module configured to stop the engine of the motor vehicle while the motor vehicle is one of:
      coasting and stopped;
   an engine start module configured to restart the engine, the engine start module being configured to:
      request an engine restart after stopping the engine;
      decrease a K-factor in a torque converter coupling within 1.5 seconds of requesting the engine restart;
      engage a forward drive clutch; and
      increase the K-factor in the torque converter coupling.

10. The control system of claim 9, wherein the engine start module is configured to decrease the K-factor in the torque converter coupling by at least partially engaging a torque converter lockup clutch, the engine start module being configured to increase the K-factor in the torque converter coupling by disengaging the torque converter lockup clutch.

11. The control system of claim 10, wherein the engine start module is configured to decrease the K-factor in the torque converter coupling within a half second of before or after an initial rotation of an engine crankshaft upon restart of the engine.

12. The control system of claim 11, wherein the engine start module is configured to cause the motor vehicle to begin to move after decreasing the K-factor in the torque converter coupling and increasing the K-factor in the torque converter coupling.

13. The control system of claim 12, the engine start module being further configured to engage a starter motor subsequent to decreasing the K-factor of the torque converter coupling and prior to increasing the K-factor of the torque converter coupling.

14. The control system of claim 13, wherein the engine start module is further configured to enable a hydraulic pressure system.

15. The control system of claim 14, the engine start module being further configured to engage the torque converter to create a fluid coupling between an impeller and a turbine subsequent to decreasing the K-factor of the torque converter coupling and increasing the K-factor of the torque converter coupling.

16. A propulsion system of a motor vehicle, the propulsion system comprising:

an engine operable to power the motor vehicle, the engine having a crankshaft configured to rotate to move a plurality of pistons within a plurality of piston cylinders, the engine having an engine output shaft configured to transfer torque;

a torque converter coupling connected to the engine output shaft, the torque converter coupling having a torque converter and a torque converter lockup clutch, the torque converter having an impeller and a turbine, the impeller being connected to the engine output shaft, the impeller being configured to form a fluid coupling with the turbine, the torque converter lockup clutch being configured to selectively lock together the impeller and the turbine;

a forward drive clutch connected to the turbine;

a transmission configured to selectively change a gear ratio between the engine output shaft and a transmission output shaft, the forward drive clutch being configured to selectively connect the turbine to the transmission; and a control system comprising:

an engine stop module configured to stop the engine while the motor vehicle is one of: coasting and stopped;

an engine start module configured to restart the engine, the engine start module being configured to:

decrease a K-factor in the torque converter coupling within a half second of an initial rotation of the crankshaft upon the restart of the engine;

engage the forward drive clutch; and increase the K-factor in the torque converter coupling after decreasing the K-factor in the torque converter coupling.

17. The propulsion system of claim 16, wherein the engine start module is configured to decrease the K-factor in the torque converter coupling by at least partially engaging the torque converter lockup clutch, the engine start module being configured to increase the K-factor in the torque converter coupling by disengaging the torque converter lockup clutch.

18. The propulsion system of claim 17, wherein the engine start module is configured to cause the motor vehicle to begin to move after decreasing the K-factor in the torque converter coupling and after increasing the K-factor in the torque converter coupling.

19. The propulsion system of claim 18, the engine start module being further configured to engage a starter motor after decreasing the K-factor of the torque converter coupling and prior to increasing the K-factor of the torque converter coupling, wherein the engine start module is further configured to enable a hydraulic pressure system.

20. The propulsion system of claim 19, the engine start module being further configured to engage the torque converter to create a fluid coupling between the impeller and the turbine after decreasing the K-factor of the torque converter coupling and after increasing the K-factor of the torque converter coupling.

* * * * *